US012640282B2

(12) United States Patent
Ye et al.

(10) Patent No.: US 12,640,282 B2
(45) Date of Patent: May 26, 2026

(54) INSULATED WIRE AND PREPARATION METHOD THEREFOR, WINDING WIRE, AND ELECTRICAL DEVICE

(71) Applicant: Well Ascent Electronic (Ganzhou) Co., Ltd., Ganzhou City (CN)

(72) Inventors: Huimin Ye, Ganzhou City (CN); Yuejia Zhu, Ganzhou City (CN); Zuomao Zhu, Ganzhou City (CN)

(73) Assignee: Well Ascent Electronic (Ganzhou) Co., Ltd., Ganzhou City (CN)

( * ) Notice: Subject to any disclaimer, the term of this patent is extended or adjusted under 35 U.S.C. 154(b) by 17 days.

(21) Appl. No.: 19/011,675

(22) Filed: Jan. 7, 2025

(65) Prior Publication Data

US 2026/0120917 A1 Apr. 30, 2026

(30) Foreign Application Priority Data

Jun. 28, 2024 (CN) ......................... 202410859707.1

(51) Int. Cl.
*H01B 7/00* (2006.01)
*H01B 3/30* (2006.01)
(Continued)

(52) U.S. Cl.
CPC ........... *H01B 7/0283* (2013.01); *H01B 3/306* (2013.01); *H01B 3/427* (2013.01);
(Continued)

(58) Field of Classification Search
CPC ...... H01B 3/306; H01B 3/427; H01B 7/0275; H01B 7/292; H01B 3/30; H01B 7/02;
(Continued)

(56) References Cited

U.S. PATENT DOCUMENTS

2019/0272932 A1* 9/2019 Kuroda .................... H01B 7/30
2020/0211734 A1* 7/2020 Tachibana ................ H02K 3/12
2023/0128381 A1* 4/2023 Sasaki ..................... C04B 35/46 501/134

FOREIGN PATENT DOCUMENTS

CN 102812524 A 12/2012
CN 104321833 A 1/2015
(Continued)

OTHER PUBLICATIONS

First Office Action of counterpart Chinese Patent Application No. 202410859707.1 issued on Aug. 1, 2024.
(Continued)

*Primary Examiner* — Pete T Lee

(57) ABSTRACT

The present disclosure provides an insulated wire and a preparation method therefor, a winding wire, and an electrical device, relating to the technical field of electrochemical elements. The insulated wire includes a conductor and an intermediate layer and an insulating layer sequentially coated on the conductor; the insulating layer includes thermoplastic polyimide and polyetheretherketone; a mass percentage of the thermoplastic polyimide in the insulating layer ranges from 85% to 95%, and a mass percentage of the polyetheretherketone in the insulating layer ranges from 5% to 15%; the number of bubbles with a pore size of 30 μm or more in the insulating layer is not more than 5 per 100 m.

20 Claims, 2 Drawing Sheets

(51) Int. Cl.

| | |
|---|---|
| ***H01B 3/42*** | (2006.01) |
| ***H01B 7/02*** | (2006.01) |
| ***H01B 13/00*** | (2006.01) |
| ***H01B 13/14*** | (2006.01) |
| ***H01B 13/32*** | (2006.01) |
| ***H01B 17/36*** | (2006.01) |

(52) U.S. Cl.
CPC ....... *H01B 13/0016* (2013.01); *H01B 13/145* (2013.01); *H01B 13/148* (2013.01); *H01B 13/32* (2013.01); *H01B 17/36* (2013.01)

(58) Field of Classification Search
CPC ........ H01B 13/14; H01B 3/308; H01B 3/305; H01B 3/42; H01B 13/148; H01B 13/065; H01B 7/0216; H01B 13/00; H01B 7/00; H01B 7/17; H01B 7/1805; H01B 1/023; H01B 13/146; H01B 13/24; H01B 3/36; H01B 3/441; H01B 13/22; H01B 1/02; H01B 1/026; H01B 13/002; H01B 13/30; H01B 3/38; H01B 3/442; H01B 7/0208; H01B 7/188; H01B 7/0283; H01B 13/0016; H01B 13/145; H01B 13/32; H01B 17/36
See application file for complete search history.

(56) References Cited

FOREIGN PATENT DOCUMENTS

| | | | |
|---|---|---|---|
| CN | 107004465 | A | 8/2017 |
| CN | 107004466 | A | 8/2017 |
| CN | 118348017 | A | 7/2024 |
| IN | 201747012386 | A | 4/2017 |
| JP | 2014105257 | A | 6/2014 |

OTHER PUBLICATIONS

Notice of Allowance of counterpart Chinese Patent Application No. 202410859707.1 issued on Aug. 27, 2024.

* cited by examiner

INSULATED WIRE AND PREPARATION METHOD THEREFOR, WINDING WIRE, AND ELECTRICAL DEVICE

CROSS-REFERENCE TO RELATED APPLICATIONS

The present disclosure claims the priority of the Chinese patent application No. 2024108597071, filed with the Chinese Patent Office on Jun. 28, 2024, and entitled "INSULATED WIRE AND PREPARATION METHOD THEREFOR, WINDING WIRE, AND ELECTRICAL DEVICE", which is incorporated herein by reference in its entirety.

TECHNICAL FIELD

The present disclosure relates to the technical field of electrochemical elements, and particularly to an insulated wire and a preparation method therefor, a winding wire, and an electrical device.

BACKGROUND ART

Polyimide (PI) is one of the organic polymer materials with the best comprehensive performance. It has the characteristics of corrosion resistance, fatigue resistance, damage resistance, impact resistance, small density, low noise, long service lifetime, etc., as well as excellent high and low temperature performance (without deformation at −269° C.-280° C. for a long time). It has a thermal decomposition temperature of up to 600° C., and is one of the polymers with the highest heat stability so far. Thermoplastic polyimide (TPI) is one of the special engineering plastics developed on the basis of PI and having good thermoplastic machinability. It not only can be molded by all processing methods for thermosetting PI, but also can be molded by a method suitable for extrusion and injection molding of thermoplastics. Therefore, it is particularly suitable for molding products with complex structures in one step, without secondary processing, thus solving the problems of difficulty in molding and processing the conventional thermosetting PI, single product form, etc.

However, as the TPI is formed by introducing a flexible chain or linear chain segment structure into a monomer molecular structure for synthesizing PI, although the thermoplastic machinability of the PI is improved, the high-temperature performance and heat resistance thereof are degraded. Therefore, when extrusion molding is performed through an extrusion process, bubbles often appear in an extruded layer formed from the TPI, thus causing obvious degradation in mechanical property and heat resistance of a film layer formed thereby. Particularly for an insulated wire which has high requirements on adhesive force, mechanical property and breakdown voltage of a coating layer, bubbles appearing in the coating layer obviously reduce the breakdown voltage and the adhesive force, and cracks are more likely to occur during winding. This is also one of the main reasons that make it difficult to apply the TPI as a main resin material in a coating layer of an insulated conductive wire.

SUMMARY

One of the objectives of the present disclosure is to provide an insulated wire, so as to overcome the defect in the prior art that bubbles are easy to appear in an extrusion process when thermoplastic polyimide is taken as a main resin of an insulating layer, to cause a breakdown voltage of the insulating layer to be reduced.

Another objective of the present disclosure is to provide a preparation method for an insulated wire.

A further objective of the present disclosure is to provide a winding wire.

A further objective of the present disclosure is to provide an electrical device.

In the first aspect, the present disclosure discloses an insulated wire, where the insulated wire includes a conductor and an intermediate layer and an insulating layer sequentially coated on the conductor;

a material of the insulating layer includes thermoplastic polyimide and polyetheretherketone; and the number of bubbles with a pore size of 30 μm or more in the insulating layer is not more than 5 per 100 m.

Further, in some embodiments of the present disclosure, the number of bubbles with a pore size of 30 μm or more in the insulating layer is not more than 1 per 100 m.

Further, in some embodiments of the present disclosure, a maximum value Dmax of the pore size of the bubbles in the insulating layer is not larger than 50 μm.

Further, in some embodiments of the present disclosure, a mass percentage of the thermoplastic polyimide in the insulating layer ranges from 85% to 95%, and a mass percentage of the polyetheretherketone in the insulating layer ranges from 5% to 15%.

Further, in some embodiments of the present disclosure, the intermediate layer includes polyamide-imide, polyimide and a solvent, and a solvent content in the intermediate layer is not higher than 200 ppm.

A coating solution of the intermediate layer comprises, in part by weight, 67-79 parts of an organic solvent, 20-30 parts of a polyamide-imide resin and 1-3 parts of a polyimide resin.

Further, in some embodiments of the present disclosure, a glass transition temperature of the polyetheretherketone is at least 90° C. lower than that of the thermoplastic polyimide.

Further, in some embodiments of the present disclosure, a melting point of the polyetheretherketone is lower than that of the thermoplastic polyimide.

Further, in some embodiments of the present disclosure, the melting point of the thermoplastic polyimide is at least 45° C. higher than that of the polyetheretherketone.

Further, in some embodiments of the present disclosure, the polyimide used in the intermediate layer has a melting point higher than that of the thermoplastic polyimide.

Further, in some embodiments of the present disclosure, a thickness of the insulating layer ranges from 50 μm to 250 μm; and a thickness of the intermediate layer ranges from 5 μm to 30 μm.

Further, in some embodiments of the present disclosure, the thickness of the intermediate layer is 1/20-1/10 of the thickness of the insulating layer.

Further, in some embodiments of the present disclosure, the intermediate layer is formed by performing a coating and curing process multiple times; and the insulating layer is formed by stepwise cooling after an extrusion process.

Further, in some embodiments of the present disclosure, under a condition that the insulated wire is ring cut (circumferentially cut) and stretched by 20%, a length of the insulating layer losing adhesion is not greater than a width of the conductor.

Further, in some embodiments of the present disclosure, when the insulating layer has the thickness ranging from 100

μm to 120 μm, a local breakdown voltage of the insulated wire is not lower than 12 KV; when the insulating layer has the thickness ranging from 120 μm to 140 μm, the local breakdown voltage of the insulated wire is not lower than 14 KV; and when the insulating layer has the thickness of greater than 140 μm, the local breakdown voltage of the insulated wire is not lower than 16 KV.

In the second aspect, the present disclosure further provides a preparation method for an insulated wire, including a coating and curing process and an extrusion process, the coating and curing process includes: coating a coating solution for forming an intermediate layer on a surface of a conductor, and curing to form a single bonding layer, which are repeated multiple times so as to form the intermediate layer; and the extrusion process includes: forming an insulated layer including the polyetheretherketone and thermoplastic polyimide on the surface of the conductor through the extrusion process.

Further, in some embodiments of the present disclosure, the extrusion process is provided with a temperature zone A, a temperature zone B, a temperature zone C and a temperature zone D in sequence, a temperature in the temperature zone A is lower than melting points of the polyetheretherketone and the thermoplastic polyimide; a temperature in the temperature zone B is not lower than the melting point of the polyetheretherketone and lower than the melting point of the thermoplastic polyimide; and neither temperatures in the temperature zone C and the temperature zone D are lower than the melting point of the thermoplastic polyimide.

Further, in some embodiments of the present disclosure, the temperature in the temperature zone A ranges from 60° C. to 280° C., the temperature in the temperature zone B ranges from 320° C. to 380° C., the temperature in the temperature zone C ranges from 370° C. to 400° C., and the temperature in the temperature zone D ranges from 370° C. to 430° C.

Further, in some embodiments of the present disclosure, the polyetheretherketone and the thermoplastic polyimide stay in the temperature zone B for 10-45 min.

Further, in some embodiments of the present disclosure, the polyetheretherketone and the thermoplastic polyimide stay in the temperature zone A for 10-45 min.

Further, in some embodiments of the present disclosure, a particle size of the polyetheretherketone is 1/100-1/10 of that of the thermoplastic polyimide.

Further, in some embodiments of the present disclosure, water contents in the polyetheretherketone and the thermoplastic polyimide are not higher than 0.03%.

Further, in some embodiments of the present disclosure, an intermediate product preheating process is further included between the coating and curing process and the extrusion process, the intermediate product preheating process includes: preheating the conductor of the intermediate layer to 250° C.-320° C. before entering extrusion equipment.

Further, in some embodiments of the present disclosure, a heating method of the intermediate product preheating process is high-frequency induction heating and/or infrared thermal radiation heating.

Further, in some embodiments of the present disclosure, after the extrusion process, the preparation method further includes: a heat preservation process, the heat preservation process includes: maintaining the conductor formed with the insulating layer by extrusion at a heat preservation temperature for 10-20 s, where the heat preservation temperature is not lower than a crystal precipitation temperature of the thermoplastic polyimide and not higher than a crystal nucleation temperature of the thermoplastic polyimide.

In the third aspect, the present disclosure further provides a winding wire, including the insulated wire according to the first aspect or the insulated wire prepared by the preparation method for an insulated wire according to the second aspect.

In the fourth aspect, the present disclosure further provides an electrical device, including the insulated wire according to the first aspect, the insulated wire prepared by the preparation method for an insulated wire according to the second aspect or the winding wire according to the third aspect.

The present disclosure has following beneficial effects.

The present disclosure provides an insulated wire, where the TPI with high heat resistance and high impact resistance is taken as the main resin of the insulating layer, and a small amount of PEEK that is not easy to decompose and has a melting point lower than that of the TPI is added therein, so as to overcome the defect that bubbles are formed in the insulating layer as the TPI is decomposed due to high-temperature extrusion to emit gases, and overcome the defect that the bubbles in the insulating layer cause the mechanical property, adhesive force and breakdown voltage resistance to be reduced. Besides, between the insulating layer and the conductor of the insulated wire provided in the present disclosure, the intermediate layer is provided for increasing the adhesive force between the insulating layer with the TPI as the main resin and the conductor, where amorphous PI resin in the intermediate layer can better improve the adhesive force with the insulating layer, so that the insulated wire has better adhesive force.

The insulated wire provided in the present disclosure can be applied to high-voltage platforms of 800 V, 900 V, 1000 V and above, as well as electrical devices, such as drive motor, motors, and transformers, of which an operating temperature can be up to 220° C.

DETAILED DESCRIPTION OF EMBODIMENTS

Figure 1:
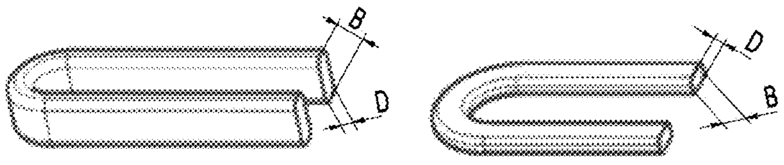
FIG. 1 is a schematic diagram of a test method of a bending machinability test of the present disclosure.

In order to better explain the present disclosure, detailed description is given with reference to embodiments of the present disclosure, and main contents of the present disclosure are further illustrated in conjunction with specific embodiments, but the contents of the present disclosure are not merely limited to the following embodiments.

Insulating resin of an insulated wire for insulated coating of a conductor can achieve a good insulation effect, but is also one of the key factors that affect applications of the insulated wire, because resins generally have poor heat resistance and mechanical property. Thus, selecting an insulating resin with better heat resistance and mechanical property has become one of the main ways to improve the heat resistance and mechanical property of the insulated wire. PI is one of the resin materials with the most excellent thermal property and mechanical property in the resins found at present, and thus also becomes a hot choice for a material of an insulating layer of the insulating resin. However, common thermosetting resins are difficult to form on the insulated wire through an extrusion process, have a high processing cost, a complicated procedure, and high brittleness, and are prone to cracks during winding. In this regard, the applicant thought of using thermoplastic PI as the insulating layer, which can be formed on a conductive wire through the extrusion process, has a lower processing cost and better toughness, is not prone to cracks during winding, and is particularly suitable for the insulated wire that requires winding. However, thermal stability of TPI is lower than that of ordinary PI, and the applicant particularly found that in the extrusion process, some bubbles appear in the insulating layer formed from the TPI as a main resin, and appearance of these bubbles causes obvious reduction in local breakdown voltage of the insulated wire. Moreover, during the winding, the insulated wire is also prone to cracks in or near areas with more bubbles, and mechanical strength of the insulating layer and adhesive force with the conductor are also obviously decreased. In view of this, the applicant believes that possibly due to the presence of some oxidizing components, such as oxygen, in an extrusion equipment and a high extrusion temperature in the extrusion process of the TPI, the TPI is decomposed or cracked or reacted, so that small molecular gases escape, and further cause appearance of bubbles in the insulating layer.

Regarding this defect, the applicant proposes in the present disclosure a new insulated wire. A small amount of polyetheretherketone (PEEK) is added into the insulating layer, and through properties of thermal stability of the PEEK (less prone to decomposition or escape of small gaseous molecules at high temperatures) and low melting point of the PEEK (lower than a melting point of TPI), the PEEK is enabled to be coated on a surface of the TPI, to block contact between the TPI and oxidizing components such as oxygen, so that the TPI is not prone to decomposition or cracking or oxidation reaction, and even if a small amount of gaseous small molecules appear, they are also prevented from converging into larger bubbles during the extrusion, thus reducing generation of bubbles in the insulating layer of the insulated wire, and particularly reducing generation of bubbles with a relatively large width, for example, reducing the generation of bubbles with a width of greater than 30 μm, and further improving breakdown voltage, mechanical property, and thermal property of the insulated wire and adhesive force between the insulated layer and the conductor. Preferably, for the novel insulated wire provided in the present disclosure, the bubbles in the formed insulating layer are generally less than 10 μm, and even less than 5 μm. In a process of judging qualification of products, 100 m-long insulated wire taken as a sample is detected for presence of bubbles in the insulating layer thereof and the width of existing bubbles. If the number of bubbles with the width of greater than 30 μm in the sample is greater than 5, the insulated wire is considered unqualified. In a more preferred insulated wire sample, the number of bubbles with the width of greater than 30 μm in the insulating layer of 100 m-long insulated wire is not more than 1, even the number of bubbles with the width of greater than 30 μm in the insulating layer of the 1000 m-long insulated wire is not more than 1; and further preferably, there are no bubbles with the width of greater than 30 μm.

Alternatively, in a more preferred insulated wire sample, 100 m-long insulated wire taken as a sample is detected that the number of bubbles with the width of greater than 20 μm in the insulating layer thereof is not more than 1; and even the number of bubbles with the width of greater than 15 μm in the insulating layer of the 100 m-long insulated wire is not more than 1.

Figure 2:
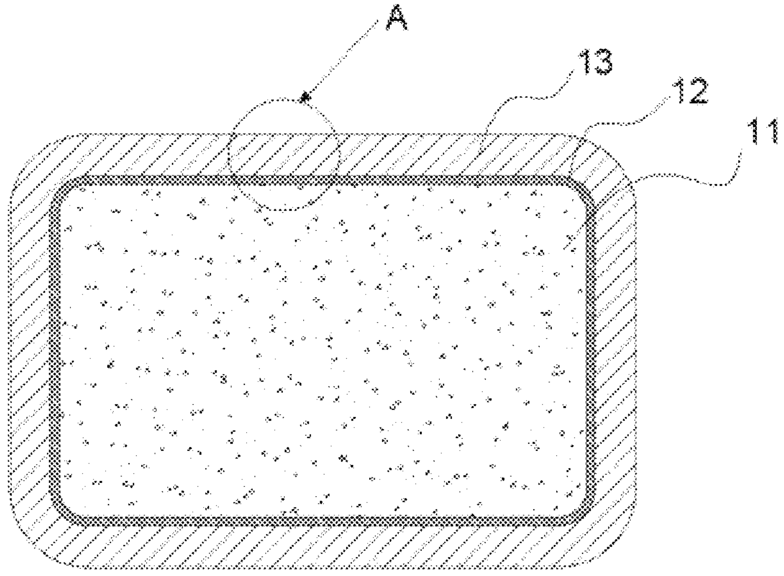
FIG. 2 is a sectional view of an insulated wire provided in the present disclosure.
Figure 3:
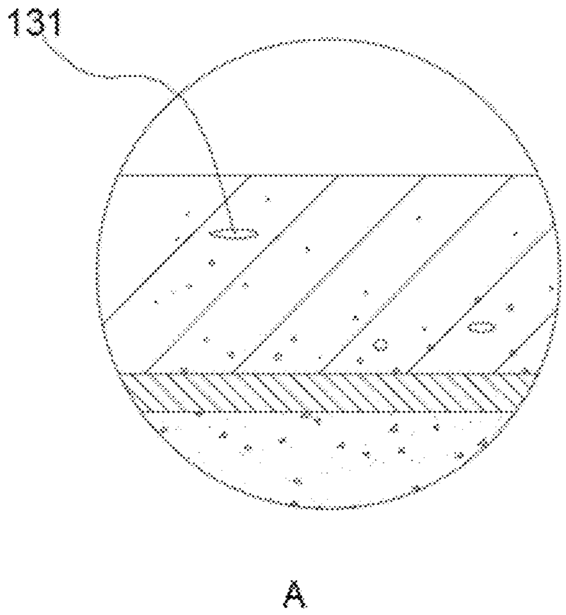
FIG. 3 is an enlarged view of a part A of FIG. 2.

The width of the bubbles in the insulating layer in the present disclosure is a maximum value of width of vertical projections of the bubbles on a surface of a conductor nearest to the bubble. In addition, the applicant found that the bubbles in the insulating layer, particularly those with a larger diameter, such as bubbles with the diameter of greater than or close to 30 μm, generally are not spherical, as shown in FIG. 2 and FIG. 3. This may be due to the fact that the bubbles are formed in a short period of time, and this process is accompanied by pressure of a die orifice on the insulating layer and cooling and curing of the resins, and forces of the bubbles in all directions are not the same, making it difficult to form large spherical bubbles. This may also be a reason why the insulating layer still can maintain good breakdown resistance and heat resistance even in the presence of large bubbles of approximately 30 μm.

Alternatively, in a more preferred insulated wire sample, when viewed from a cross section of the insulated wire, there are few and even no bubbles in the insulating layer, and when there are bubbles, the maximum width of the bubbles is less than 10 μm, and even less than 5 μm.

A conductor 11 is a conductive structure for realizing current transmission in an insulated wire, and is coated in a center of an intermediate layer 12 mainly playing a bonding role and an insulating layer 13 mainly having an insulation function. In the present disclosure, the conductor is not limited in cross-sectional shape or size, and it can be a conventional conductor with a cross section in a width direction of, for example, a circular, square or waist-shaped structure, or a conductor with a cross section in a width direction of, for example, a trapezoidal, elliptical, triangular or other special shape. Preferably, the conductor can be sized to be 0.3-25 mm×0.2-5 mm. In addition, in the present disclosure, a material of the conductor is not limited, and the conductor can be a metal conductor, such as copper, iron, aluminum, silver, zinc or other metal conductors, or an alloy conductor, such as iron-nickel, iron-cobalt-nickel, copper-nickel, copper-cobalt and iron-silicon-aluminum conductors. The material of the conductor is preferably copper conductive wire, depending on cost and conductive wire performance.

The intermediate layer in the present disclosure plays a main role in increasing an adhesive force between the insulating layer and the conductor, and it is formed by coating and curing multiple times a solution formed by polyamide-imide (PAI) and polyimide dissolved in an organic solvent. In the above, a thickness of the intermediate layer is generally 1/10-1/20 of the insulating layer, for example, the thickness thereof can range from 5 μm to 30 μm, and the thickness thereof can be adjusted according to the thickness of the insulating layer. If the thickness of the insulating layer is increased, the thickness of the intermediate layer can be appropriately increased so as to increase the adhesive force thereof. However, the intermediate layer should not be too thick, so as to prevent the entire insulated wire from being too thick to increase winding difficulty and a space required by a winding and reduce energy efficiency in a unit space.

In addition, as the intermediate layer comprises PI, the PI used in the intermediate layer is PI that can be softened above a glass transition temperature, and the TPI in the insulated layer is a thermoplastic resin developed on the basis of conventional polyimide, the two have a certain similarity in structure and a higher adhesive force. In the above, both PAI and PI in the intermediate layer are nanoscale-scale or micron-scale powders, where PI is preferably submicron-scale or nanoscale powder; and a particle size of the PAI can be adjusted according to cost and other requirements.

The PI in the intermediate layer is preheated and softened in a preheating process prior to the extrusion process, so that the adhesive force between the intermediate layer and the insulated layer can be further increased, and a good adhesion effect is achieved. In this process, a preheating temperature in the preheating process is preferably lower than a melting point of the PI of the intermediate layer, and is higher than the glass transition temperature of the PI of the intermediate layer, so that it can form a high elastic state in the preheating process, and has increased viscosity and improved adhesive force with the TPI. Meanwhile, it has low fluidity, and under restriction of a curing network of the PAI, it is still not obviously displaced even in a process of high-speed advancing of the conductor, without affecting stability of the intermediate layer. Because the PI needs to be dispersed in the network of the PAI and needs to ensure its adhesive force, an amount of the PI added into the intermediate layer should not be too high or too low. Preferably, the amount of the PI added into the intermediate layer is 1/10-1/30 of the PAI, and more preferably, the amount of the PI added into the intermediate layer is 1/18-1/30 of the PAI.

Preferably, the melting point and the glass transition temperature of the PI in the intermediate layer are higher than the melting point and the glass transition temperature of the PI in the insulated layer.

Exemplarily, the glass transition temperature of the PI used in the intermediate layer is higher than 250° C., preferably higher than 300° C.

In the above, the PAI used in a coating solution of the intermediate layer of the present disclosure is preferably an amorphous resin with a glass transition temperature of 300° C. or below, and an elastic modulus thereof ranges from 300 MPa to 800 MPa.

The applicant found that although the thermoplastic polyimide has better corrosion resistance, fatigue resistance, damage resistance, and impact resistance, when it is formed as an insulating layer on a surface of a conductor through the extrusion process, some bubbles are easy to form in the insulating layer, which not only reduces the mechanical property of the insulating layer, but also causes obvious reduction in local breakdown voltage of the insulating layer in severer cases (places with bubbles are more vulnerable to breakdown). It may be due to that the thermoplastic polyimide is decomposed or cracked or reacted during the extrusion after being in contact with oxidizing substances such as oxygen in the extrusion equipment, and small molecular gases escape. Regarding this, after several experiments, the applicant found that even if the extrusion process is performed in a protective gas environment, although the defect is overcome, the bubbles in the insulating layer formed thereby are still not obviously improved sufficiently and the local breakdown voltage and mechanical strength thereof are still reduced. In view of this, the applicant believes that the bubbles appearing in the extrusion process of the insulating layer with the thermoplastic polyimide as the main resin may originate from various sources, and it may be difficult to achieve a desired effect only by controlling oxygen content in an atmosphere environment in the extrusion process.

In this regard, the applicant proposes a new solution.

An insulating layer takes thermoplastic polyimide as a main resin, and is added with a small amount of PEEK, so that the low melting point and the property of not decomposing to diffuse small molecular gases of the PEEK are utilized to prevent contact between TPI and oxidizing components such as oxygen, and meanwhile can also prevent small molecular gases from possible sources from converging, thus controlling a content and a pore size of bubbles in the insulating layer, and improving mechanical property and local breakdown voltage of the insulated layer made mainly from the thermoplastic polyimide by extrusion. In the above, a mass percentage of the thermoplastic polyimide in the insulating layer ranges from 85% to 95%, and a mass percentage of the polyetheretherketone in the insulating layer ranges from 5% to 15%. In the above, an amount of the PEEK added should not be too high or too low. A too low amount of the PEEK added will result in poor coating effect on the surface of the TPI, cannot well prevent the contact between oxygen or other oxidizing components and the TPI, and has a poor effect of reducing the bubbles in the insulating layer. However, as high-temperature resistance and mechanical flexibility of the PEEK are inferior to that of the TPI, an excessive addition amount of the PEEK will cause obvious reduction in the overall high-temperature resistance and mechanical property of the insulating layer. Moreover, as the breakdown resistance of the PEEK is also inferior to that of the TPI, excessive addition of the PEEK will also reduce the breakdown voltage of the insulating layer. Preferably, the mass percentage of the PEEK in the insulating layer ranges from 6% to 10%, more preferably from 7% to 10%.

In order to achieve better coating and prevent the contact between the TPI and oxygen, for raw materials of the TPI and PEEK added in the extrusion process, a particle size of the PEEK is 1/100-1/10 of that of the TPI, so that the PEEK is more homogeneously dispersed in interstices of the TPI, the PEEK is dispersed more homogeneously in the mixing, the coating effect is better, and the amount of the PEEK used is also fewer.

In the above, the melting point of the TPI is not lower than 370° C., preferably not lower than 380° C., still more preferably not lower than 385° C. The glass transition temperature of the TPI is not lower than 220° C., preferably not lower than 230° C. The melting point of the PEEK is lower than that of the TPI, for example, the melting point may be from 320° C. to 350° C., preferably not higher than 343° C. The glass transition temperature of the PEEK is also lower than that of the TPI, for example, the glass transition temperature of the PEEK may not be higher than 153° C. Preferably, the melting point of the PEEK is at least 45° C. lower than that of the TPI, so that in a process of mixing and melting the PEEK and the TPI, the PEEK is molten first and attached to surfaces of TPI particles to form a coating structure, thus inhibiting escape of small molecular gases of the TPI during extrusion and preventing them from forming a large number of bubbles. Even if some small molecular gases escape, the small molecular gases can also be prevented from converging into larger bubbles in the extrusion process to obviously affect the mechanical property and voltage resistance thereof.

In addition, adding the PEEK into the TPI can also increase viscosity of the melt-extruded resin, and overcome the defect of difficult molding of the TPI due to low viscosity and high fluidity. This is because at an extrusion temperature, the PEEK has higher viscosity than the TPI.

The number of bubbles with the pore size of 30 μm or more in the insulating layer is not more than 1 per 100 m, which can be detected by a visual detection system provided in a patent (filing No.: CN202310025492.9).

Preferably, a maximum value Dmax of the pore size of the bubbles in the insulating layer is not larger than 50 μm, that is, there are no bubbles in the insulating layer or the pore size of the maximum bubble thereof is not higher than 50 μm. This is because a greater width of the bubbles has greater influence on the local breakdown voltage, mechanical property, and thermal property; therefore, in the insulating layer, not only the number of bubbles needs to be controlled, but also the width size of the bubbles needs to be controlled, so as to avoid large-width bubbles, which cause obvious reduction of the local breakdown voltage, and further make it difficult to use the whole insulated wire at high temperature and high voltage.

In the present disclosure, conductors used are all conductors having undergone degreasing, cleaning, and drying, and surfaces of the conductors are clean surfaces.

In the present disclosure, an intermediate layer is formed on the conductor by performing a coating and curing process multiple times of a coating solution (solution formed by the PI and PAI with an organic solvent), where a thickness of each coating and curing should not be too high or too low, and the thickness of single coating and curing generally can be kept at 2-3 μm, not more than 5 μm or lower than 2 μm as far as possible, so as to avoid the problem that a required thickness of the intermediate layer can be reached only by too many times of coating and curing, which causes that an innermost layer is cured too many times and is easy to age, and the adhesive force between the intermediate layer and the conductor and service lifetime of a resin composite layer are affected.

After the intermediate layer is coated and cured, a solvent content in the intermediate layer is not higher than 200 ppm, preferably not higher than 100 ppm, more preferably not higher than 50 ppm, so as to avoid influence of residual organic solvent on the insulated wire. Preferably, the organic solvent is selected as far as possible to be an organic solvent free of halogens, sulfur and metal elements, so as to avoid conductor corrosion, resin composite layer aging, etc. caused by precipitation or migration of halogens, sulfur and metal elements in a process of using the insulated wire.

In the above, the coating solution for forming the intermediate layer comprises, in part by weight, 67-79 parts of the organic solvent, 20-30 parts of a polyamide-imide resin and 1-3 parts of a polyimide resin; and viscosity of the coating solution at 20° C. is 3,000-8,000 mPa·s, preferably 4,000-7,000 mPa·s, further more preferably 5,000-6,000 mPa·s. It should be noted that the polyimide used in the present disclosure is thermoplastic polyimide, the PAI used is a modified PAI resin, the PAI forms a network structure after coating and curing, and the thermoplastic PI is restricted in the network structure. As the content of the PAI in the intermediate layer in the present disclosure is far higher than that of the PI, curing of the intermediate layer in the present disclosure is actually curing of the PAI, rather than complete curing of the PAI and PI. In addition, the organic solvent used therein can be at least one of amide solvents such as N,N-dimethylacetamide (DMAC) and N,N-dimethylformamide (DMF); solvents such as N,N-dimethylethyleneurea, N,N-dimethylpropyleneurca, and urea tetramethylurea; lactone solvents such as γ-butyrolactone and γ-caprolactone; carbonate solvents such as propylene carbonate; ketone solvents such as methyl ethyl ketone, methyl isobutyl ketone, and cyclohexanone; ester solvents such as ethyl acetate, n-butyl acetate, butyl cellosolve acetate, butyl carbitol acetate, ethyl cellosolve acetate, and ethyl carbitol acetate; glyme solvents such as diglyme, triglyme, and tetraglyme; hydrocarbon solvents such as toluene, xylene, and cyclohexane; phenol solvents such as cresol and phenol; sulfone solvents such as sulfolane; and dimethyl sulfoxide (DMSO).

In addition, some auxiliaries, such as flatting agents and wetting agents, can also be added into the coating solution according to coating requirements thereof. A sum of amounts of other auxiliaries added is usually not more than 1% by mass fraction.

In the present disclosure, a temperature of the intermediate layer at each curing preferably ranges from 250° C. to 450° C. Preferably, a thickness of a single-layer structure formed in each coating and curing is consistent as far as possible.

A core wire after the intermediate layer is formed is preheated to 250° C.-320° C. and then enters extrusion equipment. Preferably, a preheating temperature thereof preferably ranges from 270° C. to 310° C. In the above, a heating method of a preheating process for an intermediate product is high-frequency induction heating and/or infrared thermal radiation heating. A gas environment of the preheating is preferably a static protective gas environment or a low-flow-rate protective gas environment, preferably the low-flow-rate protective gas environment, so as to avoid contact of oxygen in the air with the intermediate product. In addition, the heating method thereof is preferably the high-frequency induction heating, which has a high heating rate, can rapidly heat from the inside of the conductor to the outside, and heats more uniformly.

The extrusion equipment used in the extrusion process is provided with at least four temperature zones: a temperature zone A, a temperature zone B, a temperature zone C and a temperature zone D. A temperature in the temperature zone A is lower than the melting points of the polyetheretherketone and the thermoplastic polyimide; a temperature in the temperature zone B is not lower than the melting point of the polyetheretherketone and lower than the melting point of the thermoplastic polyimide; and neither temperatures in the temperature zone C and the temperature zone D are lower than the melting point of the thermoplastic polyimide. Exemplarily, the temperature in the temperature zone A ranges from 60° C. to 280° C., the temperature in the temperature zone B ranges from 320° C. to 380° C., the temperature in the temperature zone C ranges from 370° C. to 400° C., and the temperature in the temperature zone D ranges from 370° C. to 430° C. A control method therefor is not limited, where a protective gas can be introduced, and the control can also be realized in a method of forming negative pressure.

The PEEK and TPI, when entering the extrusion equipment through a feed port, are stirred and mixed in the temperature zone A to form a mixture, which then enters the temperature zone B. As the temperature in the temperature zone B is higher than the melting point of the PEEK and lower than the melting point of the TPI, and PEEK particles are small, the PEEK can be rapidly molten and uniformly dispersed among the TPI particles in the stirring process, so as to form coating, prevent contact between the TPI and oxygen or other oxidizing components, and meanwhile also prevent direct contact between the TPI particles. After resultant enters the temperature zone C, the temperature is further raised, the TPI is softened and molten to form a molten material, which then enters the temperature zone D, and is extruded and coated on the surface of the conductor, thus forming the insulating layer.

Preferably, the PEEK and TPI are dried before entering the extrusion equipment, so as to control water contents in the PEEK and TPI, and avoid influence of water molecules in the raw materials on the insulating layer. Preferably, the water contents of the PEEK and TPI after drying are controlled to be within 0.03%. In the above, a drying temperature of the TPI ranges from 150° C. to 200° C., and a drying duration ranges from 4 h to 24 h, so as to control the water content in the dried TPI to be lower than 0.03%; a drying temperature of the PEEK ranges from 120° C. to 200° C., and a drying duration ranges from 4 h to 24 h, so as to control the water content in the dried PEEK to be lower than 0.03%. This is because raw materials with high water content will easily cause water molecules to increase pores in the insulating layer during the extrusion, increase an amount and size of pores in the insulating layer, and affect the breakdown voltage, thermal resistance and adhesive force of the insulated wire. Still further preferably, the TPI and PEEK are dried in a vacuum environment or a negative-pressure environment, and are conveyed through a dry conveying pipeline between a drying device of the TPI and PEEK and the feed port of the extrusion equipment, so as to prevent the dried TPI and PEEK from absorbing water from air.

Heat Preservation Process

After the insulating layer is formed by extrusion, the conductor is not immediately cooled rapidly, but is cooled stepwise to around a crystal precipitation temperature of the TPI, such as around 280° C. to 320° C., preserved at the temperature for a period of time, and then cooled, so as to control crystal growth of the TPI, thus avoiding too large TPI crystals or too low crystallization rate. In the above, heat preservation duration is not lower than 10 s and not higher than 30 s.

After the heat preservation, a required insulated wire can be obtained by natural cooling.

The present disclosure further provides a winding wire, including the insulated wire according to the first aspect or the insulated wire prepared by the preparation method for the insulated wire according to the second aspect. The winding wire can be a winding wire formed by any winding method, for example, a winding method for a flat wire motor: I-pin, Hair-pin, X-pin, and S-winding.

The present disclosure further provides an electrical device, including the insulated wire according to the first aspect, the insulated wire prepared by the preparation method for the insulated wire according to the second aspect or the winding wire according to the third aspect. The insulated wire in the electrical device can go through a winding process, such as in motors, transformers, and inverters, and can also be power transmission lines or conductive wires that are used without winding, such as power transmission wires.

Hereinafter, description is made with several examples related to the present disclosure, but it is not intended to limit the present disclosure to these examples.

Example 1

An example of the present disclosure provides a preparation method for an insulated wire, specifically including the following steps:

S1: taking a copper wire (with a size of 2 mm×3 mm) having undergone degreasing, cleaning, and drying for later use; vacuum-drying TPI (with a glass transition temperature of 243° C. and a melting point of 388° C.) with an average particle size of 2 mm at a temperature of 150° C. for 4 h, so as to enable a water content thereof to be lower than 0.03% for later use; vacuum-drying PEEK (with a glass transition temperature of 143° C. and a melting point of 343° C.) with an average particle size of 50 μm in a drier at a temperature of 120° C. for 4 h, so as to enable a water content thereof to be lower than 0.03% for later use; heating, stirring, and dissolving polyamide-imide, polyimide and N,N-dimethylacetamide (DMAC) in a mass ratio of 28:2:70 and then formulating the same into a coating solution of an intermediate layer, where viscosity of the coating solution of the intermediate layer at 20° C. was 5,900 mPa·s;

S2: coating the coating solution of the intermediate layer on a surface of conductor, and curing at a temperature of 350° C., which steps were repeated 4 times, so as to render the intermediate layer with a thickness of 12 μm;

S3: preheating the conductor formed with the intermediate layer in step S3 to 290° C. using a high-frequency induction heating device in a protective gas ($N_2$) environment, and making the preheated conductor enter an extrusion equipment in the protective gas ($N_2$) environment, where temperatures in temperature zones in the extrusion equipment were 120° C., 350° C., 388° C., and 400° C. in sequence; performing extrusion to render a semi-finished product; and adding TPI and PEEK in a ratio of 95:5; and S4: cooling the semi-finished product to 280° C., maintaining the temperature for 12 s, and then cooling and molding, so as to render an insulated wire 1, where an insulated layer had a thickness of 120 μm.

Example 2

An example of the present disclosure provides a preparation method for an insulated wire, specifically including the following steps:

S1: taking a copper wire (with a size of 2 mm×3 mm) having undergone degreasing, cleaning, and drying for later use; vacuum-drying TPI (with a glass transition temperature of 243° C. and a melting point of 388° C.) with an average particle size of 3 μm at a temperature of 200° C. for 12 h, so as to enable a water content thereof to be lower than 0.03% for later use; vacuum-drying PEEK (with a glass transition temperature of 143° C. and a melting point of 343° C.) with an average particle size of 100 μm in a drier at a temperature of 150° C. for 8 h, so as to enable a water content thereof to be lower than 0.03% for later use; formulating polyamide-imide, polyimide and N,N-dimethylacetamide (DMAC) in a mass ratio of 30:3:67 into a coating solution of an intermediate layer, where viscosity of the coating solution of the intermediate layer at 20° C. was 6,000 mPa·s;

S2: coating the coating solution of the intermediate layer on a surface of conductor, and curing at a temperature of 350° C., which steps were repeated 3 times, so as to render the intermediate layer with a thickness of 8 μm;

S3: preheating the conductor formed with the intermediate layer in step S3 to 310° C. using a high-frequency induction heating device in a protective gas ($N_2$) environment, and making the preheated conductor enter an extrusion equipment in the protective gas ($N_2$) environment, where temperatures in temperature zones in the extrusion equipment were 250° C., 370° C., 390° C., and 420° C. in sequence; an advancing speed of the conductor was 9 m/min; performing extrusion to render a semi-finished product; and adding TPI and PEEK in a ratio of 85:15; and S4: cooling the semi-finished product to 300° C., maintaining the temperature for 15 s, and then cooling and molding, so as to render an insulated wire 2, where an insulated layer had a thickness of 120 μm.

Example 3

An example of the present disclosure provides a preparation method for an insulated wire, specifically including the following steps:

S1: taking a copper wire (with a size of 2 mm×3 mm) having undergone degreasing, cleaning, and drying for later use; vacuum-drying TPI (with a glass transition temperature of 243° C. and a melting point of 388° C.) with an average particle size of 3 μm at a temperature of 200° C. for 12 h, so as to enable a water content thereof to be lower than 0.03% for later use; vacuum-drying PEEK (with a glass transition temperature of 143° C. and a melting point of 343° C.) with an average particle size of 100 μm in a drier at a temperature of 150° C. for 8 h, so as to enable a water content thereof to be lower than 0.03% for later use; formulating polyamide-imide, polyimide and N,N-dimethylacetamide (DMAC) in a mass ratio of 20:1:79 into a coating solution of an intermediate layer, where viscosity of the coating solution of the intermediate layer at 20° C. was 5,000 mPa·s;

S2: coating the coating solution of the intermediate layer on a surface of conductor, and curing at a temperature of 350° C., which steps were repeated 4 times, so as to render the intermediate layer with a thickness of 10 μm;

S3: preheating the conductor formed with the intermediate layer in step S3 to 270° C. using a high-frequency induction heating device in a protective gas ($N_2$) environment, and making the preheated conductor enter an extrusion equipment in the protective gas ($N_2$) environment, where temperatures in temperature zones in the extrusion equipment were 250° C., 370° C., 390° C., and 420° C. in sequence; performing extrusion to render a semi-finished product; and adding TPI and PEEK in a ratio of 90:10; and S4: cooling the semi-finished product to 300° C., maintaining the temperature for 15 s, and then cooling and molding, so as to render an insulated wire 3, where an insulated layer had a thickness of 120 μm.

Example 4

Compared with Example 1, in step S4 of the present example, the TPI and PEEK were added in a ratio of 85:15, and other steps were the same as those in Example 1, so as to render an insulated wire 4, where an insulated layer had a thickness of 120 μm.

Example 5

Compared with Example 1, a thickness of an insulated layer formed by extrusion in step S4 of the present example was 140 μm, and other steps were the same as those in Example 1, so as to render an insulated wire 5.

Example 6

Compared with Example 1, a thickness of an insulated layer formed by extrusion in step S4 of the present example was 100 μm, and other steps were the same as those in Example 1, so as to render an insulated wire 6.

Comparative Example 1

Compared with Example 1, in step S3 of the present comparative example, the PEEK was not added, and other steps were the same as those in Example 1, so as to render a comparative electric wire 1.

Comparative Example 2

Compared with Example 1, in step S3 of the present comparative example, a mass ratio of the PEEK to the TPI added was 30:70, and other steps were the same as those in Example 1, so as to render a comparative electric wire 2.

Comparative Example 3

Compared with Example 1, in step S3 of the present comparative example, the mass ratio of the PEEK to the TPI added was 40:60, and other steps were the same as those in Example 1, so as to render a comparative electric wire 3.

Comparative Example 4

Compared with Example 1, in step S3 of the present comparative example, the mass ratio of the PEEK to the TPI added was 3:97, and other steps were the same as those in Example 1, so as to render a comparative electric wire 4.

Comparative Example 5

Compared with Example 1, in step S3 of the present comparative example, the average particle size of the PEEK was 2 mm, the average particle size of the TPI was 2 mm, and other steps were the same as those in Example 1, so as to render a comparative electric wire 5.

Comparative Example 6

Compared with Example 1, the coating solution used in step S1 of the present comparative example was a coating solution of an intermediate layer formulated by polyamide-imide: N,N-dimethylacetamide (DMAC) in a mass ratio of 30:70; and other steps were the same as those in Example 1, so as to render a comparative electric wire 6.

Physical parameters and property parameters of the conductors and the electric wires obtained in the above Example 1 to Example 6 and Comparative Example 1 to Comparative Example 6 were tested respectively by the following test methods, and specific test methods were as follows:

Test Methods:

1—Adhesion Test 300 mm of the insulated wires obtained in Examples 1-6 and Comparative Example 1 were taken as samples respectively. In the middle of length of each sample, the sample was ring cut until the conductor. The sample was placed between two clamps, kept on the same axis as the clamps, with two ends being clamped, and stretched by 20% at a rate of 300 mm/min, to check a length of the insulated layer losing adhesion of the sample.

2—Flexibility Test

The flexibility test was conducted on the insulated wires of Examples 1-6 and Comparative Examples 1-6 respectively by the following method.

Flexibility test: two 500 mm-long straight insulated wires were respectively bent by 180±2° around a polished test spindle, where one was flat-wise wound (spindle width=2 times the wire thickness), and the other was edgewise wound (spindle width=2 times the wire width). In FIG. 1, "B" and "D" represent the width and thickness of the insulated wires respectively.

In the present test, after flat-wise winding and edgewise winding, products having smooth surfaces without cracks were recorded as "Pass", while those having cracked surfaces were recorded as "Fail".

3—Test of Breakdown Voltage of Insulated Layer

The insulated layer was removed from one end of each insulated wire, the insulated wire was bent on a round rod with φ 25 mm with its wide edge contacting with the round rod, and placed into a metal steel ball container with a thickness of at least 5 mm, where an end of the sample should extend out to a sufficient length so as to avoid flashover. A test voltage was applied between the conductor and metal steel balls. The voltage was boosted at a boosting speed of 500 V/s and a leakage current of 5 mA. 5 times of test were performed, and an average value was taken.

4—Heat Resistance Test

The insulated wires were exposed at 240° C. for 100 h, and then the breakdown voltage of the insulated layers thereof was tested according to the test method described in "3-Test of breakdown voltage of insulated layer" in the above.

5—Bubble Detection

An on-line visual detection device was used to perform on-line bubble detection on the insulated wires. The on-line visual detection device was used to perform the on-line bubble detection for the insulated wires, where a detection method can adopt a visual detection technology in the prior art or the method in the patent application CN202310025492.9.

100 m of the insulated wires of Examples 1-6 and Comparative Examples 1-6 were respectively taken as samples, and on-line visual detection was performed on circumferential insulating layers of the samples.

Test results thereof are as shown in TABLE 1.

TABLE 1

| | Insulated wire | | | | | |
|---|---|---|---|---|---|---|
| | Breakdown voltage (KV) | U-bending test | Losing adhesion (mm) | Heat resistance (KV) | Number of bubbles (pcs/per 100 m) | $D_{max}$ (μm) |
| Example 1 | 15.8 | Pass | 1.6 | 14.2 | 0 | 28 |
| Example 2 | 15.1 | Pass | 2.2 | 13.6 | 0 | 26 |
| Example 3 | 15.6 | Pass | 1.8 | 14.1 | 1 | 32 |
| Example 4 | 14.9 | Pass | 2.2 | 13.5 | 0 | 27 |
| Example 5 | 18.3 | Pass | 1.6 | 16.5 | 0 | 23 |
| Example 6 | 12.5 | Pass | 1.5 | 11.3 | 0 | 29 |
| Comparative Example 1 | 10.5 | Fail | 2.9 | 9.5 | >50 | 156 |
| Comparative Example 2 | 13.5 | Pass | 2.3 | 11.2 | 0 | 19 |
| Comparative Example 3 | 13.1 | Pass | 2.8 | 10.6 | 0 | 16 |
| Comparative Example 4 | 14.6 | Pass | 1.9 | 12.6 | 6 | 49 |
| Comparative Example 5 | 13.7 | Pass | 2.1 | 12.9 | >50 | 91 |
| Comparative Example 6 | 15.5 | Fail | 6.5 | 13.9 | 1 | 32 |

Notes: "Number of bubbles (pcs/per 100 m)" in TABLE 1 refers to the number of bubbles with the width of greater than 30 μm on the samples of the 100 m-long insulated wires.

It can be seen from TABLE 1 that the insulated wires provided in the present disclosure used the TPI as the insulating layer 13, and a small amount of the PEEK was added therein for restricting the decomposition or cracking of the TPI or preventing the small molecular gases generated by the decomposition or cracking of the TPI from converging into larger bubbles to affect the breakdown voltage and heat resistance of the insulated wires. It can be seen from the examples, Comparative Example 1 and Comparative Example 2 that the amount of the PEEK added obviously affected optimization of the breakdown voltage and heat resistance of the insulated wires; several large-width bubbles 131 easily appeared in the insulating layers 13 without adding the PEEK, and the insulating layers 13 were easy to crack in a bending process and were not suitable for winding. Although an excessive addition amount of the PEEK restricted formation of bubbles in the insulating layers, the insulating layers were reduced in heat resistance and were also prone to cracking in the bending process, thus being not suitable for winding.

It should be noted that, the width of the bubbles in the insulating layer in the present disclosure refers to the maximum width of projections of the bubbles on the surface of the conductor nearest to the bubbles, rather than the bubbles being spherical bubbles. In fact, the inventors found that the bubbles in the insulating layer in the present disclosure are generally not spherical, but are mostly flat, especially bubbles with the width of greater than 10 μm, and a size thereof in thickness (thickness direction of the insulating layer) generally is not more than ½ of the width. When the bubbles are smaller, a shape of the bubbles is closer to a spherical shape, as shown in FIG. 3.

The present disclosure can be implemented in forms other than those described in the above without departing from the spirit thereof. The embodiments disclosed in the present disclosure are examples, but the present disclosure is not limited thereto.

What is claimed is:

1. An insulated wire, wherein the insulated wire comprises a conductor and an intermediate layer and an insulating layer sequentially coated on the conductor;

a material of the insulating layer comprises thermoplastic polyimide and polyetheretherketone; a mass percentage of the thermoplastic polyimide in the insulating layer ranges from 85% to 95%, and a mass percentage of the polyetheretherketone in the insulating layer ranges from 5% to 15%; and the number of bubbles with a pore size of 30 μm or more in the insulating layer is not more than 5 per 100 m; and under a condition that the insulated wire is ring cut and stretched by 20%, a length of the insulated wire losing adhesion is not greater than a width of the conductor.

2. The insulated wire according to claim 1, wherein the number of the bubbles with the pore size of 30 μm or more in the insulating layer is not more than 1 per 100 m.

3. The insulated wire according to claim 1, wherein a maximum value Dmax of the pore size of the bubbles in the insulating layer is not larger than 50 μm.

4. The insulated wire according to claim 1, wherein the intermediate layer comprises polyamide-imide, polyimide and a solvent, and a solvent content in the intermediate layer is not higher than 200 ppm.

5. The insulated wire according to claim 1, wherein a coating solution for forming the intermediate layer comprises, in part by weight, 67-79 parts of an organic solvent, 20-30 parts of a polyamide-imide resin and 1-3 parts of a polyimide resin.

6. The insulated wire according to claim 1, wherein a glass transition temperature of the polyetheretherketone is at least 90° C. lower than that of the thermoplastic polyimide; and/or a melting point of the thermoplastic polyimide is at least 45° C. higher than that of the polyetheretherketone; and polyimide used in the intermediate layer has a melting point higher than that of the thermoplastic polyimide.

7. The insulated wire according to claim 1, wherein a thickness of the insulating layer ranges from 50 μm to 250 μm; and a thickness of the intermediate layer ranges from 5 μm to 30 μm.

8. The insulated wire according to claim 7, wherein the thickness of the intermediate layer is 1/20-1/10 of the thickness of the insulating layer.

9. The insulated wire according to claim 1, wherein the intermediate layer is formed by performing a coating and curing process multiple times; and the insulating layer is formed by stepwise cooling after an extrusion process.

10. The insulated wire according to claim 1, wherein when the insulating layer has a thickness ranging from 100 μm to 120 μm, a local breakdown voltage of the insulated wire is not lower than 12 KV; when the insulating layer has the thickness ranging from 120 μm to 140 μm, the local breakdown voltage of the insulated wire is not lower than 14 KV; and when the insulating layer has the thickness of greater than 140 μm, the local breakdown voltage of the insulated wire is not lower than 16 KV.

11. A winding wire, comprising the insulated wire according to claim 1.

12. An electrical device, comprising the winding wire according to claim 11.

13. A preparation method for an insulated wire, comprising a coating and curing process and an extrusion process, wherein the coating and curing process comprises: coating a coating solution for forming an intermediate layer on a surface of a conductor, and curing to form a single bonding layer, which are repeated multiple times so as to form the intermediate layer; and the extrusion process comprises: forming an insulating layer comprising polyetheretherketone and thermoplastic polyimide on the surface of the conductor through the extrusion process, wherein a mass percentage of the thermoplastic polyimide in the insulating layer ranges from 85% to 95%, a mass percentage of the polyetheretherketone in the insulating layer ranges from 5% to 15%; the number of bubbles with a pore size of 30 μm or more in the insulating layer is not more than 5 per 100 m; and under a condition that the insulated wire is ring cut and stretched by 20%, a length of the insulated wire losing adhesion is not greater than a width of the conductor.

14. The preparation method for an insulated wire according to claim 13, wherein the extrusion process is provided with a temperature zone A, a temperature zone B, a temperature zone C and a temperature zone D in sequence;

a temperature in the temperature zone A is lower than melting points of the polyetheretherketone and the thermoplastic polyimide; a temperature in the temperature zone B is not lower than the melting point of the polyetheretherketone and lower than the melting point of the thermoplastic polyimide; and neither temperatures in the temperature zone C and the temperature zone D are lower than the melting point of the thermoplastic polyimide; and/or the temperature in the temperature zone A ranges from 60° C. to 280° C., the temperature in the temperature zone B ranges from 320° C. to 380° C., the temperature in the temperature zone C ranges from 370° C. to 400° C., and the temperature in the temperature zone D ranges from 370° C. to 430° C.

15. The preparation method for an insulated wire according to claim 14, wherein the polyetheretherketone and the thermoplastic polyimide stay in the temperature zone B for 10-45 min; and/or the polyetheretherketone and the thermoplastic polyimide stay in the temperature zone A for 10-45 min.

16. The preparation method for an insulated wire according to claim 13, wherein a particle size of the polyetheretherketone is 1/100-1/10 of that of the thermoplastic polyimide; and/or water contents in the polyetheretherketone and the thermoplastic polyimide are not higher than 0.03%.

17. The preparation method for an insulated wire according to claim 13, further comprising an intermediate product preheating process between the coating and curing process and the extrusion process, wherein the intermediate product preheating process comprises: preheating the conductor of the intermediate layer to 250° C.-320° C. before entering extrusion equipment.

18. The preparation method for an insulated wire according to claim 17, wherein a heating method of the intermediate product preheating process is high-frequency induction heating.

19. The preparation method for an insulated wire according to claim 13, wherein after the extrusion process, the preparation method further comprises: a heat preservation process, wherein the heat preservation process comprises: maintaining the conductor formed with the insulating layer by extrusion at a heat preservation temperature for 10-20 s, wherein the heat preservation temperature is not lower than a crystal precipitation temperature of the thermoplastic polyimide and not higher than a crystal nucleation temperature of the thermoplastic polyimide.

20. The preparation method for an insulated wire according to claim 19, wherein a moving speed of the conductor is 8-15 m/min.

* * * * *